(12) United States Patent
Wiger

(10) Patent No.: US 10,171,463 B1
(45) Date of Patent: Jan. 1, 2019

(54) SECURE TRANSPORT LAYER AUTHENTICATION OF NETWORK TRAFFIC

(71) Applicant: Amazon Technologies, Inc., Seattle, WA (US)

(72) Inventor: Nathan George Wiger, San Diego, CA (US)

(73) Assignee: Amazon Technologies, Inc., Seattle, WA (US)

( * ) Notice: Subject to any disclaimer, the term of this patent is extended or adjusted under 35 U.S.C. 154(b) by 299 days.

(21) Appl. No.: 14/977,073

(22) Filed: Dec. 21, 2015

(51) Int. Cl.
*H04L 29/06* (2006.01)

(52) U.S. Cl.
CPC ...... *H04L 63/0876* (2013.01); *H04L 63/0227* (2013.01); *H04L 63/04* (2013.01); *H04L 63/06* (2013.01); *H04L 63/08* (2013.01); *H04L 63/126* (2013.01); *H04L 63/166* (2013.01); *H04L 69/16* (2013.01)

(58) Field of Classification Search
None
See application file for complete search history.

(56) References Cited

U.S. PATENT DOCUMENTS

| | | | |
|---|---|---|---|
| 9,241,066 B2 * | 1/2016 | Wong | H04L 63/0428 |
| 9,781,081 B1 * | 10/2017 | Wasiq | H04L 63/0428 |
| 9,860,225 B1 * | 1/2018 | Chamberlin | H04L 63/08 |
| 2016/0248686 A1 * | 8/2016 | Lee | H04L 47/2475 |

OTHER PUBLICATIONS

Web article: "How Do I Get Security Credentials", published by Amazon, 2015 [online][retrieved on: Dec. 21, 2015] retrieved from: http://docs.aws.amazon.com/general/latest/gr/getting-aws-sec-creds.html, 3 pages.
Web Article: "Requesting Temporary Security Credentials" published by Amazon, 2015 [online][retrieved on: Dec. 21, 2015] retrieved from: http://docs.aws.amazon.com/IAM/latest/UserGuide/id_credentials_temp_request.html, 15 pages.
Web article: "Temporary Security Credentials" published by Amazon, 2015 [online][retrieved on: Dec. 21, 2015] retrieved from: http://docs.aws.amazon.com/IAM/latest/UserGuide/id_credentials_temp.html, 4 pages.

* cited by examiner

*Primary Examiner* — Malcolm Cribbs
*Assistant Examiner* — Andrew J Steinle
(74) *Attorney, Agent, or Firm* — Lee & Hayes, PLLC

(57) ABSTRACT

Technologies are disclosed herein for transport layer network data authentication. A token packet is attached to network data sent from a client software application to an application server at the transport layer. The token packet can be generated based on a temporary token key obtained from a token service. The token packet can include a signature of the network packet payload. The network packet with the attached token packet can be received at an edge device in the network where the application server resides before reaching the application server. The edge device can verify the authenticity of the network packet by verifying the signature contained in the token packet. If the verification is successful, the edge device can forward the network packet to the application server. If the verification fails, the edge device can block further transmission of the network packet.

20 Claims, 8 Drawing Sheets

SECURE TRANSPORT LAYER AUTHENTICATION OF NETWORK TRAFFIC

BACKGROUND

Applications such as multiplayer video games and video conferencing applications pose special challenges to the computing systems hosting these applications. These applications typically require high-volume and low-latency responses. For example, game servers normally handle millions of packets per second with a few dozen bytes per packet. These packets must be handled in near real-time in order to create a responsive game experience. As such, this type of network traffic is commonly implemented using the User Datagram Protocol ("UDP") in order to achieve low latency.

In addition to the above challenges, applications such as those described above can also suffer various types of malicious network attacks, such as Distributed Denial of Service ("DDoS") attacks. Existing approaches to mitigating DDoS attacks generally do not meet the high-volume and low-latency requirements of many types of applications. For instance, some solutions require custom coding of encryption protocols such as Advanced Encryption Standard ("AES")-256 into the application tier that supports the application, which can be time-consuming and error-prone. Other solutions, such as Web Application Firewalls ("WAFs") and Hypertext Transfer Protocol Secure ("HTTPS"), are directed toward securing web traffic, and are not suitable for securing transport layer network traffic.

It is with respect to these and other considerations that the disclosure made herein is presented.

DETAILED DESCRIPTION

Figure 1:
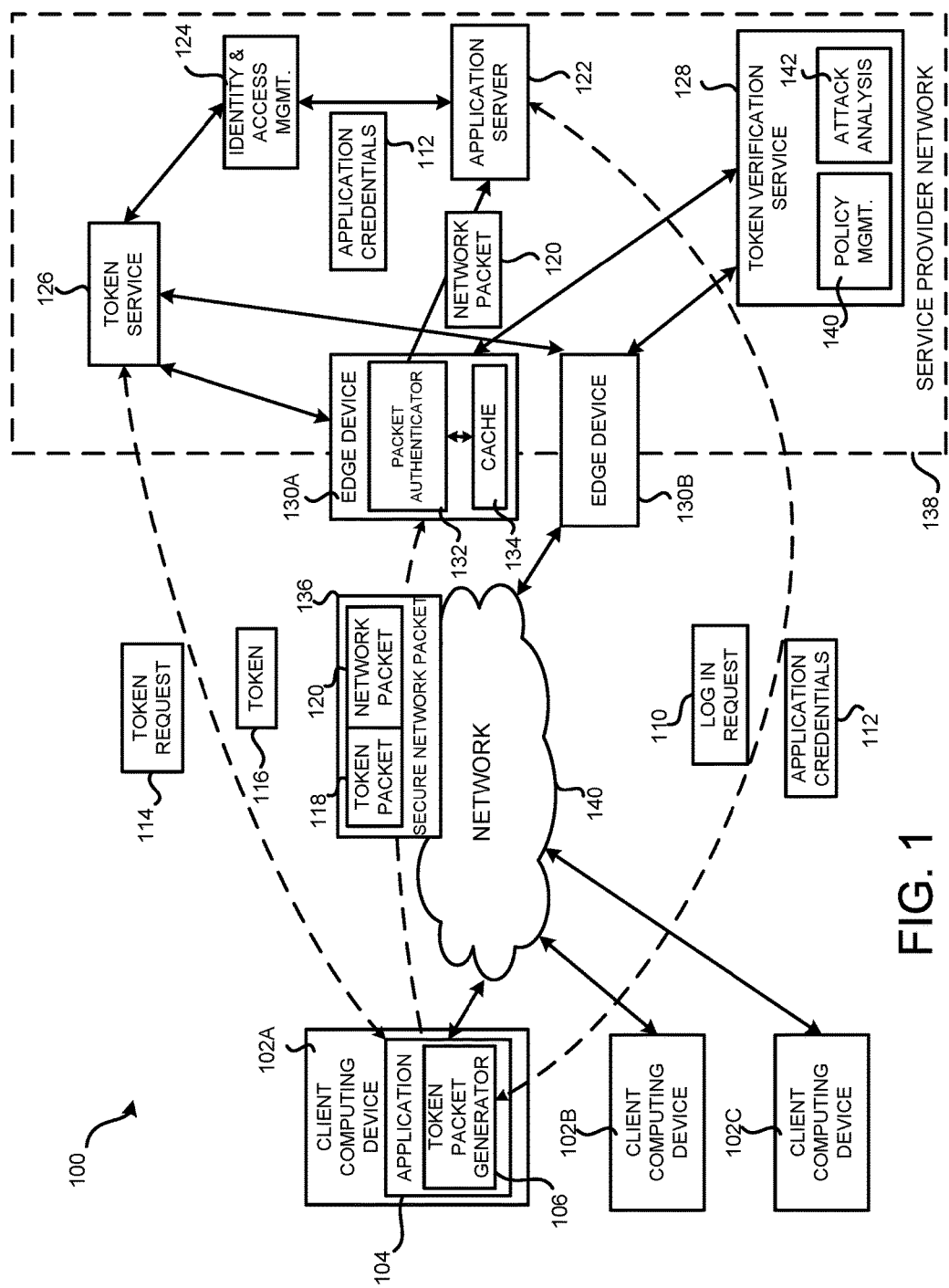
FIG. 1 is a network architecture diagram showing aspects of one illustrative mechanism described herein for transport layer authentication of network traffic in one configuration disclosed herein.

The following detailed description is directed to technologies for providing transport layer authentication of network traffic directed to an application server. Through an implementation of the technologies disclosed herein, data addressed to an application server can be authenticated and filtered at the transport layer by one or more edge devices before reaching the application server. Accordingly, the risk of the application servers suffering network attacks such as DDoS attacks can be significantly reduced.

Additionally, an implementation of the technologies disclosed herein can remove the need for custom anti-attack solutions when developing software applications, such as custom-coding an encryption layer, which can be error-prone and vulnerable to implementation oversights as mentioned above. In addition, by utilizing the edge device disclosed herein to handle network packet authentication, scaling of the network security mechanism disclosed herein can be handled by the service provider network that manages the edge devices, and can be made transparent to the developers of the software application. In should be appreciated that other technical benefits other than those described briefly above can also be realized from an implementation of the disclosed technologies.

In order to enable the functionality disclosed herein, one or more edge devices are provided in one configuration. The edge devices include devices located at the ingress point for traffic entering a network in which the destination host of the traffic is located. The edge devices disclosed herein are configured to receive network packets sent from one or more client computing devices and addressed to an application server. The network packets can be generated and sent by a client computing device having a software application executed thereupon. For example, a multiplayer game application executing on the client computing device can send a packet indicating a player's current position in a game battlefield or other game related information to the game application server in order for the player to interact with other players in the game. In another example, a video conferencing application can send packets containing video and audio information for a user of the computing device to a video conferencing server so that the user can communicate with other users of the video conference application.

According to aspects presented herein, before sending the network packets to the application server, token packets can be generated and attached to the network packets at the network transport layer to generate secure transport layer network packets. The token packets can be generated utilizing a secure token that is obtained and stored by the software application.

When an edge device receives a secure transport layer network packet, the token packet can be extracted and utilized to verify the authenticity of the network packet. For example, the token packet can include a cryptographic signature of data contained in the network packet, and the edge device can retrieve a secure key associated with the software application to verify the signature. If the authentication of the network packet is successful, the edge device can remove the token packet from the network packet and forward the network packet to the application server for further processing. If the authentication fails, the edge device can drop the network packet so that the network packet will not reach the application server.

According to one configuration presented herein, the software application executing on the client computing device can obtain the secure token utilized in generating the token packet from a token service. In some implementations, the software application can send a token request to the token service and include credentials of the software application in the token request. The application credentials can include, but are not limited to, access keys, access key IDs, passwords, and/or multi-factor authentication information. The application credentials can be obtained from the application server when a user logs into the software application. Alternatively, or additionally, the secure credentials can be included in the software application when the user initially obtains and installs the software application on the client computing device. In either case, the application credentials can be generated and managed by an identity and access management service upon a request by the application server.

Once the token service receives the token request, the token service can contact the identity and access management service to verify that the requesting software application is an authorized copy based on the application credentials included in the token request. If the verification fails, the token service can deny the token request. Otherwise, the token service can generate a secure token and send it to the client computing device. The secure token can include a token key to be utilized to generate token packets and a key identifier ("ID") that is associated with the token key.

In some implementations, the generated token can be a temporary token valid for a limited time, such as a few minutes, a few hours or a few days. Data identifying a token expiration time can be further included in the secure token to indicate when the secure token, and thus the token key contained in it, will expire. When the current token expires or is about to expire, the token service can generate and send an updated secure token to the software application until a pre-determined number of secure tokens have been sent. At that time, the software application might need to send a new token request in order to receive more secure tokens from the token service.

Once the software application receives the secure token from the token service, a token packet generator can be employed to generate a token packet for each transport layer network packet. The transport layer network packet can be a UDP packet or a Transmission Control Protocol ("TCP") packet. The token packet generator can utilize the token key included in the secure token to calculate a cryptographic signature to be included in the token packet. The signature can be calculated based on the payload of the transport layer network packet or based on the checksum of the transport layer network packet. The token packet can also include the key ID so that a corresponding verification key can be retrieved when verifying the signature. In some implementations, the token packet can further include a policy ID indicating an authorization policy to be applied to the transport layer network packet.

The generated token packet can then be attached to the corresponding transport layer network packet to generate a secure transport layer network packet. For example, the token packet can be attached to the beginning of the network packet payload, or appended to the end of the network packet payload. Depending on the type of the transport layer network packet, changes to the network packet might need to be made after attaching the token packet, such as updating the packet length in the packet header, or updating the checksum of the network packet. The generated secure network packet can then be sent to the application server.

An edge device in the network where the application server resides can receive the transport layer network packet before the packet reaches the application server. The edge device can extract the token packet from the secure transport layer network packet and verify the authenticity of the network packet. Specifically, the edge device can obtain a verification key based on the key ID included in the token packet. In order to reduce the retrieval time, verification keys can be pulled from or pushed by the token service and pre-stored in a local cache of the edge device or a cache shared by multiple edge devices. The corresponding verification key for the received token packet can be retrieved from the cache using the key ID and then utilized to verify the signature.

In implementations wherein the secure token used to generate the token packet is a temporary token, the edge device can first verify if the token corresponding to the token packet has expired before verifying the cryptographic signature. For example, when retrieving the verification key, the edge device can also retrieve an expiration time of the corresponding token. If the expiration time has passed, the edge device can drop the network packet; otherwise, the edge device can proceed with the signature verification. If the signature verification is successful, the edge device can remove the token packet from the secure transport layer network packet and forward the remaining packet to the application server. Otherwise, the network packet can be either dropped or forwarded to other services for further analysis.

If the token packet includes additional information, such as a policy ID, the edge device can retrieve the corresponding policy using the policy ID to examine if the network packet satisfies the policy requirements. Only those network packets that satisfy the policy requirements can be forwarded to the application server. Additional details regarding the various components and processes described briefly above for secure transport layer authentication of network traffic will be presented below with regard to FIGS. 1-8.

It should be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances and the like. As mentioned briefly above, the configurations described herein can be practiced in distributed computing environments, where tasks can be performed by remote computing devices that are linked through a communications network. In a distributed computing environment, program modules can be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

FIG. 1 is a block diagram depicting an illustrative operating environment 100 in which network traffic is authenticated at the transport layer. As illustrated, the operating environment 100 can include an application server 122 that executes in a service provider network 138, and one or more edge devices 130A-130B (which might be referred to herein individually as an edge device 130 or collectively as edge devices 130) that provide an entry point into the service provider network 138. Examples of edge devices 130 include, but are not limited to, routers, routing switches, integrated access devices ("IADs"), multiplexers, and metropolitan area network ("MAN") and wide area network ("WAN") access devices.

The one or more edge devices 130 and the application server 122 can be in communication with one or more client computing devices 102A-102C (which might be referred to herein individually as a client computing device 102 or collectively as client computing devices 102). The client computing device 102 can have a software application 104 executed thereon, such as a game application, a video conferencing application and/or other software applications that can communicate with the application server 122 during execution. The client computing device 102 can be a personal computer ("PC"), a desktop workstation, a laptop or tablet, a notebook, a personal digital assistant ("PDA"), an electronic book reader, a smartphone, a game console, a set-top box, a consumer electronics device, a wearable computing device, a server computer, or any other computing device capable of executing a software application 104 and communicating with the application server 122 through a network 140.

The network 140 can be any wired network, wireless network, or combination thereof. In addition, the network 140 can be a personal area network, local area network ("LAN"), WAN, cable network, satellite network, cellular telephone network, or combination thereof. The network 140 can also be an over-the-air broadcast network (e.g., for radio or television) or a publicly accessible network of linked networks, possibly operated by various distinct parties, such as the Internet. In some implementations, the network 140 can be a private or semi-private network, such as a corporate or university intranet. The network 140 can include one or more wireless networks, such as a Global System for Mobile Communications ("GSM") network, a Code Division Multiple Access ("CDMA") network, a Long Term Evolution ("LTE") network, or any other type of wireless network.

The application server 122 can be configured to provide various types of functionality to facilitate the execution of the software application 104 on the client computing devices 102. The application server 122 can be implemented as one or more server computers, Web servers, database servers, or network appliances. Alternatively, the application server 122 can be implemented as a user computing device, such as a PC, a desktop workstation, a laptop, a notebook, a mobile device, a PDA, and the like. It will be appreciated that the application server 122 can be implemented as virtually any type of server computer or user computing device known in the art.

In some configurations, the application server 122 can execute a number of modules in order to facilitate the execution of the software application 104. The modules can execute on a single application server 122 or in parallel across multiple application servers 122. In addition, each module can consist of a number of subcomponents executing on different application servers 122. The modules can be implemented as hardware or software executed by hardware.

According to further aspects presented herein, the application server 122 can be implemented using computing resources provided and managed by the service provider network 138. In particular, the service provider network 138 can allow the developer of the software application 104 to purchase and utilize computing resources, such as virtual machine ("VM") instances and/or other types of computing resources, from the service provider operating the service provider network 138 on a permanent or as-needed basis. Each type or configuration of a computing resource can be available from the service provider network 138 in different sizes. For example, a service provider can offer virtual machine instances or other types of data processing resources that are available for purchase and use that have many different configurations of processor capabilities, main memory, disk storage, and operating system.

A service provider can also offer other types of resources for purchase and use by developers. For example, a service provider can offer hardware devices, database resources, file or block data storage resources, and/or networking resources, such as load balancing resources, domain name service ("DNS") resources, virtual private cloud ("VPC") resources, virtual local area network ("VLAN") resources, and/or other types of hardware and software computing resources on a permanent or as-needed basis.

The service provider operating the service provider network 138 can also charge a fee for operating the resources to a customer that creates and uses the resources (e.g. the developer of the software application 104). The fee charged for a particular resource can be based upon the type and/or configuration of the resource. The fee charged for a particular resource can also be based upon the amount of time the resource is utilized. For example, in the case of a data processing resource, like virtual machine instances, the fee for use of the resource can be charged based upon the type of resource and upon the amount of time the resource is utilized. In the case of a data storage resource, the fee can be computed based upon the amount of data stored and/or the amount of data transferred into or out of the resource. The fees for other types of resources can also be based upon other considerations. A service provider can also utilize various purchasing models to determine the amount to charge a customer for use of resources provided by the service provider network 138.

The various resources described above can also be provisioned and de-provisioned as needed in an automated fashion. For example, the service provider network 138 can instantiate a new instance of a computing resource, such as a virtual machine instance, in order for the developer to execute the software application 104. The developer can then be permitted to utilize the new instance of the virtual machine as desired. When the developer has finished using the virtual machine instance, the virtual machine instances can be de-provisioned. Other types of computing resources can also be provisioned and de-provisioned in a similar manner to facilitate the development and deployment of the software application 104. The service provider network 138 can also provide functionality for automatically scaling and/or de-scaling resources based upon demand for the resources or other factors. Additional details regarding the service provider network 138 are described below with regard to FIGS. 6 and 7.

According to aspects presented herein, the application server 122 can be configured to obtain application credentials 112 for users of the software application 104, such as user account, passwords, and/or access keys. As briefly discussed above, the application credentials 112 for each user can be provided to the user when the user initially obtains the software application 104 or when the user attempts to log into the software application 104. For instance, a user can send a login request 110 through the software application 104 to the application server 122. The login request 110 can be sent via a single sign on service, such as through an HTTPS web service, whereby the user provides credentials for an existing user account to establish initial secure communication with the application server 122. After receiving the login request 110, the application server 122 can contact an identity and access management service 124 executing in the service provider network 138 to request the application credentials 112 be generated for the requesting user.

The identity and access management ("IAM") service 124 can be configured to allow application servers 122 to securely control access to the application server 122 or other resources associated with the application server 122. The functionality of the identity and access management service 124 can include authentication (controlling who can use the resources) and/or authorization (controlling what resources users can use and in what ways), which include, but are not limited to, creating users in the identity and access management service 124, assigning users individual security credentials (such as access keys, passwords, and multi-factor authentication devices), or requesting temporary security credentials to provide users access to services and resources provided by the application server 122.

Upon receiving a request from the application server 122, the identity and access management service 124 can return the generated application credentials 112 to the application server 122 which, in turn, can send the application credentials 112 to the client computing device 102. In some implementations, the identity and access management service 124 can generate different credentials for different users. Alternatively, or additionally, the identity and access management service 124 can generate common credentials for a group of users to avoid managing a large number of credentials.

After receiving or otherwise obtaining the application credentials 112, the user can execute the software application 104 on the client computing device 102 and perform various operations. When there is data to be sent to the application server 122, the client computing device 102 can packetize the data into one or more network packets for transmission.

According to aspects presented herein, for each transport layer network packet 120 (which might also be referred to as a network packet 120 for brevity), such as a UDP packet or a TCP packet, a token packet 118 can be generated and attached thereto. The token packet 118 can be generated by a token packet generator 106 utilizing a secure token 116. The secure token 116 can be obtained from a token service 126, which can be configured to enable applications to request temporary, limited-privilege credentials/tokens for users created and managed by the identity and access management service 124 or for users that have been authorized by the application server 122.

To request the secure token 116, the token packet generator 106 can send a token request 114 to the token service 126. The token request 114 can include the application credentials 112 for the user currently logged into the software application 104. The token service 126 can utilize the application credentials 112 to verify with the identity and access management service 124 that the token request 114 is sent from an authorized user. If the verification fails, the token service 126 can deny the token request 114; otherwise, the token service 126 can generate a secure token 116 and send it to the client computing device 102.

According to one configuration, the secure token 116 can include a token key and a key ID associated with the token key. It should be noted that the secure token 116 can be temporary in that it is valid only for a limited period of time, such as a few minutes, a few hours or a few days. In such a scenario, the secure token 116 can further include a token expiration time and the token packet generator 106 can use the secure token 116 to generate token packets 118 before the token expiration time arrives. When the secure token 116 expires or is about to expire, the token service 126 can send a new secure token 116 to the token packet generator 106 for the generation of future token packets 118. The token service 126 can stop sending the updated token 116 if a predetermined number of tokens 116 have been sent to the software application 104. At that time point, the software application 104 might need to send a new token request 114 to the token service 126 in order to receive further secure tokens 116.

Using a valid secure token 116, the token packet generator 106 can generate a token packet 118 for each of the network packets 120 to be sent out. In some implementations, the token packet 118 can include a cryptographic signature of the payload of the network packet 120 and the key ID corresponding to the token key used when generating the signature. Other information, such as a policy ID indicating the policy to be applied to the network packet 120, can also be included in the token packet 118. Additional details regarding the generation of token packets 118 will be discussed below with regard to FIGS. 2-4.

The generated token packet 116 can then be combined with the network packet 120 to form a secure transport layer network packet 136 (which might also be referred to as secure network packet 136 for brevity), such as attaching the token packet 118 to the beginning or the end of the payload of the network packet 120, or inserting it into the network packet 120. Updates to the header of the network packet 120 might need to be performed to reflect the insertion of the token packet 118, such as updating the length of the secure network packet 136 and the checksum of the secure network packet 136.

When the secure transport layer network packet 136 reaches an edge device 130, the edge device 130 can execute a packet authenticator 132 to extract the token packet 118 for authentication. The packet authenticator 132 can utilize the key ID in the token packet 118 to retrieve a verification key corresponding to the token key used when generating the signature. The verification key and the token key can be a public key and a private key of a key pair, respectively. The verification key can be obtained by the edge device 130 through sending a request to the token service 126 using the key ID.

Alternatively, to achieve a faster verification key retrieval, the edge devices 130 can pre-store various verification keys in a cache 134. The cache 134 can be a cache local to the edge device 130 or a cache shared by multiple edge devices 130, such as the MEMCACHED distributed caching system.

The verification keys can be periodically pulled from the token service 126 by the edge device 130 or pushed to the cache 134 by the token service 126.

If the secure tokens 116 issued by the token service 126 are temporary tokens, the verification keys obtained from the token service 126 can each have associated therewith an expiration time to indicate when the corresponding token expires. The packet authenticator 132 can first determine if the token has expired. If so, the secure transport layer network packet 136 can be dropped; otherwise, the packet authenticator 132 can verify the signature contained in the token packet 118 utilizing the retrieved verification key.

If the verification is successful, the edge device 130 can remove the token packet 118 from the secure transport layer network packet 136 and forward the network packet 120 to the application server 122; otherwise, the edge device 130 can block the network packet 120 to prevent it from reaching the application server 122. In some implementations, in order to reduce the latency caused by the network packet verification, the edge device 130 can perform sampling on the received secure transport layer network packets 136 and selectively authenticate the secure network packets 136 according to the process described above. However, such sampling can reduce the security of the system disclosed herein.

According to further aspects presented herein, the service provider network 138 can provide a token verification service 128 configured to perform policy management and attack analysis. A policy management module 140 can be executed to manage various policies applicable to network traffic sent from the software application 104 to the application server 122. For example, the policies can specify whether secure network packets 136 sent from a certain copy of the software application 104 are allowed to communicate with the application server 122 or other resources associated with the application server 122. The policies can also specify a time frame within which the communications between the software application 104 and the application server 122 or other resources are allowed. Other policies can also be utilized.

If certain policy is to be enforced on the secure network packet 136, the token packet 118 contained in it can further include a policy ID so that the packet authenticator 132 can retrieve the corresponding policy. The retrieved policy can then be utilized to ensure the secure network packet 136 meets the requirements set forth in the policy before forwarding it to the application server 122. The policies can be retrieved from the token verification service 128 or stored in the cache 134 for quick retrieval. It should be noted that while FIG. 1 illustrates that the policies are managed by the token verification service 128, the policies can be managed by other services provided by the service provider network 138, such as the identity and access management service 124.

The token verification service 128 can also execute an attack analysis module 142 to analyze attacks based on the received secure network packets 136. For those secure network packets 136 that fail authentication because of an expired token, invalid signature, or failure to satisfy the policy, the secure network packets 136 can be forwarded by the edge device 130 to the attack analysis module 142 for further analysis. The attack analysis module 142 can perform various analyses, such as identifying patterns of the source of the unauthorized network packets 136, determining the time of the unauthorized network packets 136 being sent, and the like. Additional details regarding the authentication of the secure transport layer network packet 136 are provided below with regard to FIG. 5.

It should be appreciated that the functionality of the edge device 130 and the packet authenticator 132 described above can be implemented as software executing on the edge device 130, or as hardware deployed in the edge device 130. In addition, scaling of the edge devices 130 can be managed by the service provider network 138 according to the volume of the network traffic, the workload of the edge devices 130 and/or other factors, which can be made transparent to the application server 122. As a result, the developer of the software application hosted by the application server 122 can be freed from considering the scaling of the system to handle changes in the volume of the network traffic. In addition, a significant number of network attacks can be blocked by the edge devices 130. As a result, developers do not need to worry about implementing anti-attack solutions and can instead focus on improving the quality of the service provided to their customers.

It should be further appreciated that while the token service 126 is illustrated as a service separate from the identity and access management service 124 in FIG. 1, the token service 126 can also be implemented as part of the identity and access management service 124. It should be further appreciated that while the token packet generator 106 is illustrated as being part of the software application 104, it can be implemented as a stand-alone application, or as a software component to be incorporated into the operating system of the client computing device 102. It can also be deployed to the client computing device 102 in a runtime library or a software development kit ("SDK"). Other implementations of the token packet generator 106 can also be utilized.

Figure 2:
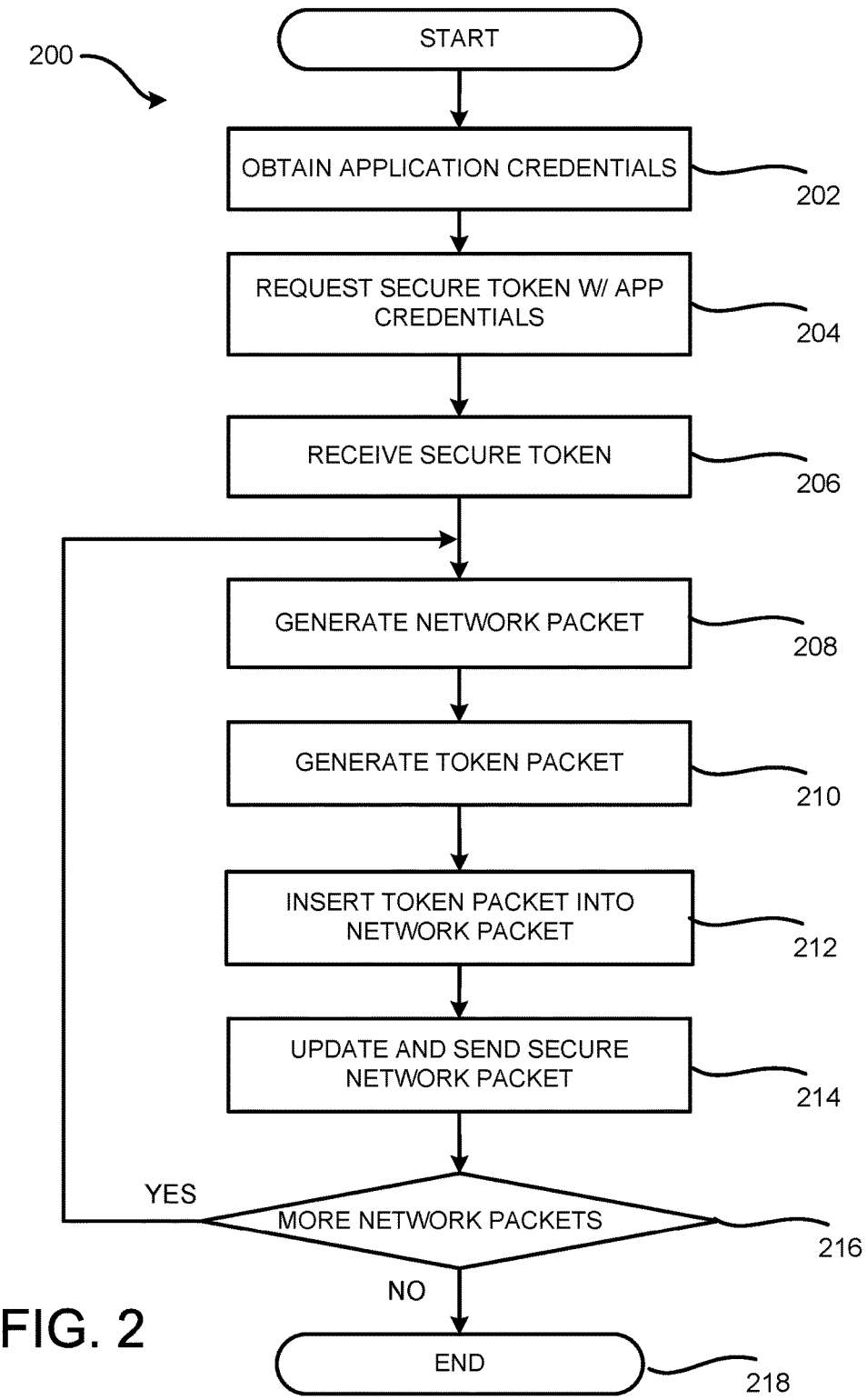
FIG. 2 is a flow diagram that illustrates aspects of a routine for generating secure transport layer network packets to be transmitted to an application server, in one configuration disclosed herein.

FIG. 2 is a flow diagram that illustrates aspects of a routine 200 for generating secure transport layer network packets 136 to be transmitted to an application server 122. FIG. 2 will be described together with FIG. 4A, which illustrates an exemplary secure token 116 and FIG. 4B, which illustrates an exemplary secure transport layer network packet 136. It should be appreciated that the logical operations described herein with respect to FIGS. 2, 3 and 5, and the other FIGS., can be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations can be performed than shown in the FIGS. and described herein. These operations can also be performed in parallel, or in a different order than those described herein. Some or all of these operations can also be performed by components other than those specifically identified.

The routine 200 begins at operation 202, where the software application 104 obtains the application credentials 112 from the application server 122. As discussed above, the application credentials 112 can be obtained when the user of the software application 104 tries to log into the software application 104 by sending a log in request 110 to the application server 122. Alternatively, the application credentials 112 can be obtained when the user downloads and installs the software application 104.

The routine 200 then proceeds to operation 204, where the software application 104 can send a token request 114 to a token service 126 to request a secure token 116 from the token service 126. For security reasons, the token request 114 can include the application credentials 112 that can be utilized by the token service 126 to verify with the identity and access management service 124 regarding the validity of the requesting software application 104. Upon receiving the token request 114, the token service 126 can verify the validity of the software application 104 and generates a secure token 116 based on the verification results.

Figure 4A:
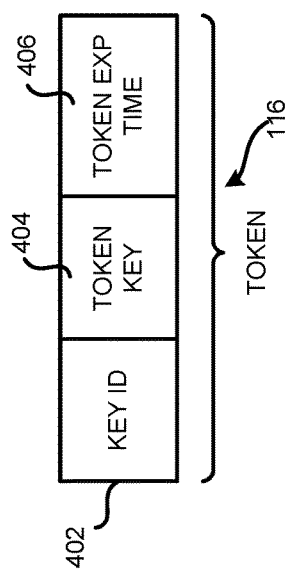
FIGS. 4A and 4B are data structure diagrams illustrating the format of an exemplary secure token and an exemplary secure transport layer network packet, respectively, in one configuration disclosed herein.

From operation 204, the routine 200 proceeds to operation 206, where the software application 104 can receive the secure token 116 from the token service 126 and store the secure token 116 in a local memory for later use. As shown in FIG. 4A, the secure token 116 can include a secure token key 404 and a key ID 402 associated with the secure token key 404. In some implementations, the secure token 116 received from the token service 126 can be a temporary token, wherein the token key 404 can be valid for a limited time. In this case, the secure token 116 can further include a token expiration time 406 as shown in FIG. 4A to indicate when the secure token 116 will expire.

When the current secure token 116 expires or is about to expire, the token service 126 can send an updated secure token 116 to the software application 104 until a certain condition is met, such as when a pre-determined number of secure tokens 116 have been sent, or when a certain amount of time has passed since the last token request 114 is received. At that time, the software application 104 might need to send a new token request 114 in order to keep receiving secure tokens 116 from the token service 126.

It should be appreciated that the subject matter described above for updating the secure token 116 is provided by way of illustration only, and should not be construed as limiting. Various other mechanisms for updating the secure token 116 can be employed. For example, the token service 126 can require a new token request 114 to be sent for each updated secure token 116. In addition, the edge device 130 can send an error message to the software application 104 if it determines that the token utilized in generating the secure network packet 136 has expired so that the software application 104 can request a new secure token 116 from the token service 126.

From operation 206, the routine 200 proceeds to operation 208, where the software application 104 can generate data to be sent to the application server 122, and this data can be packetized into multiple network packets. The routine 200 then proceeds to operation 210 where a token packet 118 can be generated for each transport layer network packet 120. The token packet 118 can be generated by a token packet generator 106 executing on the client computing device 102 based on the token key 404 and data contained in the network packet 120. Additional details regarding the generation of the token packet 118 are described below with regard to FIG. 3.

The routine 200 then proceeds to operation 212, where the generated token packet 118 can be inserted into the network packet 120 to generate a secure network packet 136. As briefly described above, the token packet 118 can be added at the beginning of the payload of the network packet 120, appended to the end of the network packet 120, or inserted in the middle of the network packet 120. To increase security, the token packet 118 can be divided into multiple portions and inserted into the network packet 120 at different places. The token packet 118 can also be inserted into the network packet 120 in other manners.

Figure 4B:
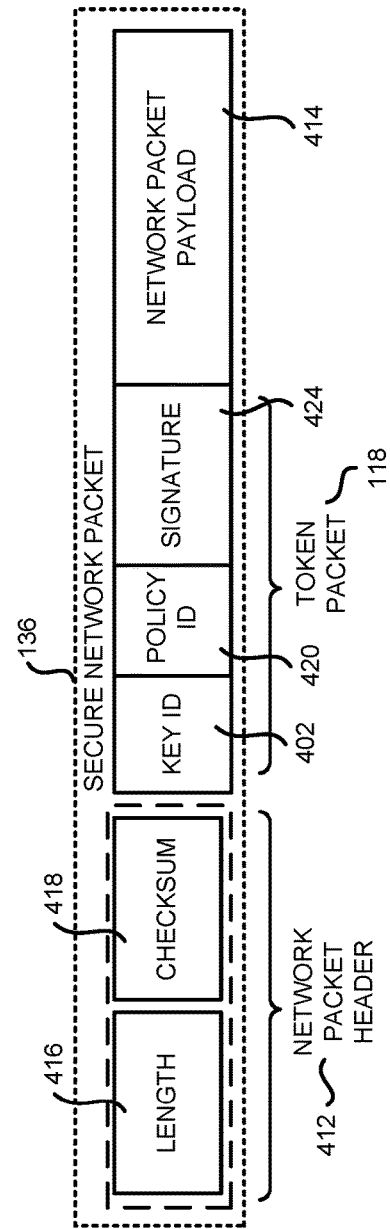

From operation 212, the routine 200 proceeds to operation 214, where the header or other fields of the generated secure network packet 136 can be updated to reflect the added token packet 118. For instance, as illustrated in FIG. 4B, the network packet 120 can include a header 412 and a payload 414. The header 412 can include a length field 416 indicating the total length of the network packet 120, and a checksum field 418 storing the checksum of the payload 414. After inserting the token packet 118, the length field 416 can be updated with the total length of the secure network packet 136. The checksum field 418 can be similarly updated. In some implementations, however, in order to reduce latency, the checksum 418 can be kept unchanged even after the token packet 118 is inserted so that the checksum of the payload 414 can be readily included in the network packet 120 when the edge device 130 forwards the network packet 120 to the application server 122.

The updated secure network packet 136 can then be sent to the application server 122 through the network 140. The routine 200 then proceeds to operation 216, where a determination is made regarding whether there are more network packets 120 to be processed. If so, the routine 200 proceeds back to operation 208; otherwise, the routine 200 proceeds to operation 218, where it ends.

Figure 3:
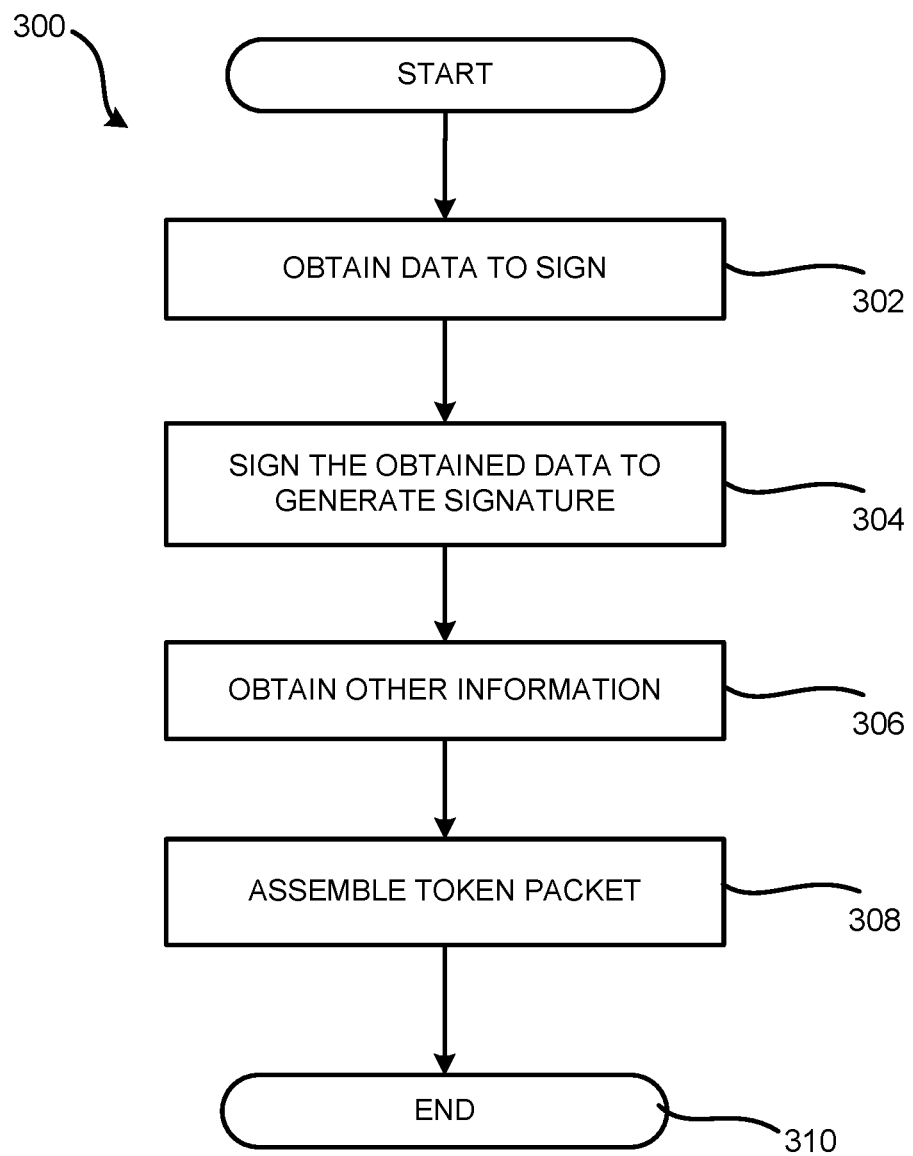
FIG. 3 is a flow diagram that illustrates aspects of a routine for generating a token packet to be added to a transport layer network packet, in one configuration disclosed herein.

FIG. 3 is a flow diagram that illustrates aspects of a routine 300 for generating a token packet 118 to be added to a transport layer network packet 120. FIG. 3 will be described together with FIGS. 4A and 4B. The routine 300 begins at operation 302, where the token packet generator 106 can obtain data from the network packet 120 in order to generate a signature 424 to be included in the token packet 118 as shown in FIG. 4B. In one implementation, the data for generating the signature 424 can include the payload 414 of the network packet 120. In other implementations, particularly when the header 412 of the network packet 120 already includes a checksum 418 of the network packet payload 414, the data for generating the signature 424 can include the checksum 418, rather than the network packet payload 414.

From operation 302, the routine 300 proceeds to operation 304 where the data obtained in operation 302 is cryptographically signed using the token key 404 to generate the signature 424. The signature 424 can be generated using any algorithm for generating digital signatures or message authentication codes known in the art, such as a keyed-hash message authentication code ("HMAC"). Depending on the algorithm used to generate the signature 424, the token key 404 can be used as the secret key to generate and verify the signature 424. Alternatively, the token key 404 can be a private key of a key pair whose public key is used to verify the signature 424.

The routine 300 then proceeds to operation 306, where additional information is obtained to be included in the token packet 118. The additional information can include, for example, the key ID 402 that can be used by the edge device 130 to retrieve a key to verify the signature. Other data can also be included, such as a policy ID 420 to facilitate the edge device 130 to identify policies applicable to the secure network packet 136.

The routine 300 then proceeds to operation 308 where data obtained from operation 306 and the generated signature 424 can be assembled according to a pre-defined order to form the token packet 118. From operation 308, the routine 300 proceeds to operation 310, where it ends. It should be appreciated that, depending on particular security requirements, not every operation described in FIG. 3 needs to be performed and not all the data illustrated in FIG. 4B needs to be included in the token packet 118. Moreover, additional data that is not illustrated in FIG. 4B can be generated and added to the token packet 118.

Figure 5:
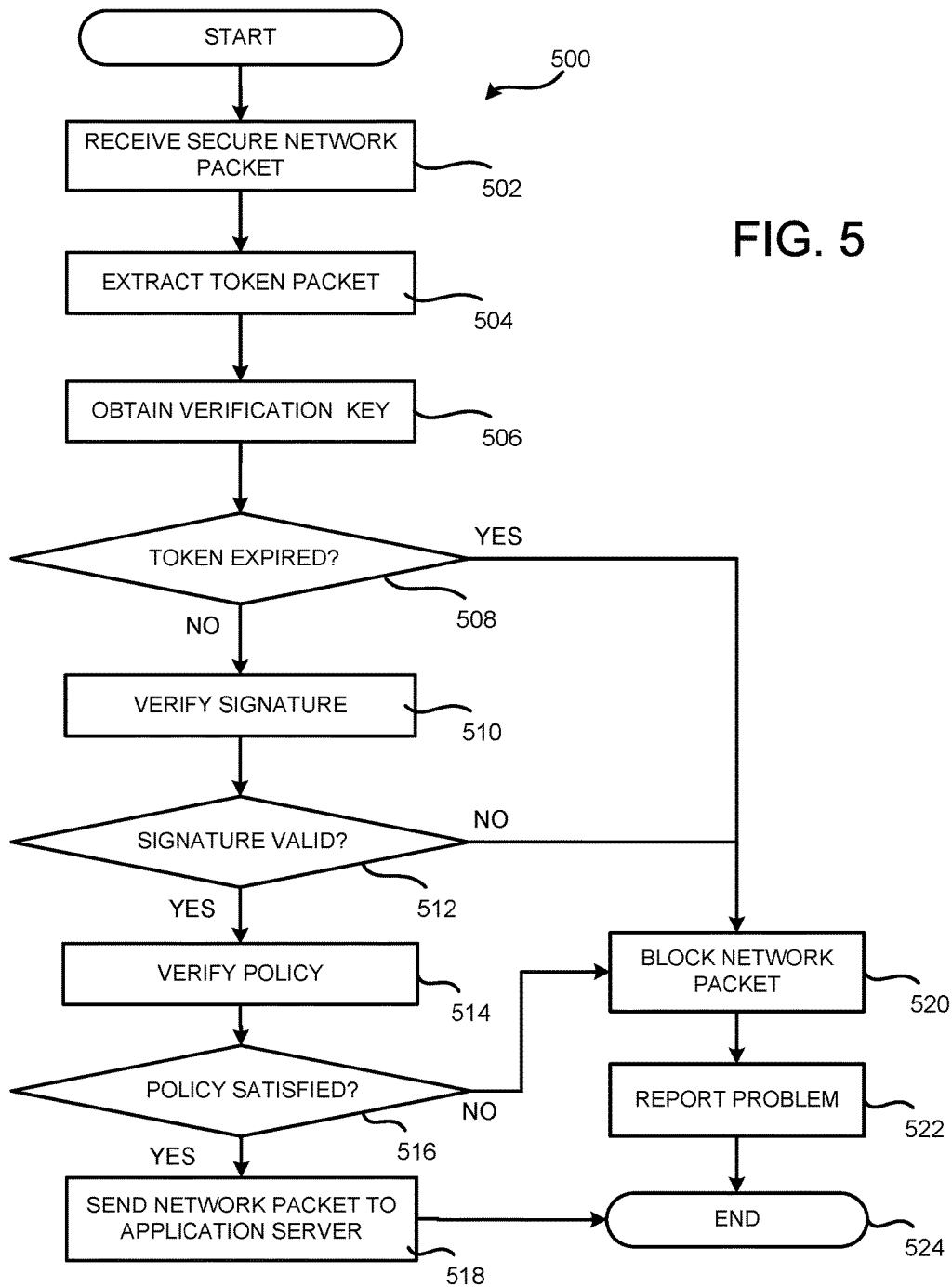
FIG. 5 is a flow diagram that illustrates aspects of a routine for authenticating secure transport layer network packets, in one configuration disclosed herein.

FIG. 5 is a flow diagram that illustrates aspects of a routine 500 for authenticating a secure transport layer network packet 136 received from a client computing device 102. The routine 500 begins at operation 502, where the edge device 130 receives a secure transport layer network packet 136. As mentioned above, the secure transport layer network packet 136 can be a secure UDP packet or a secure TCP packet.

The routine 500 then proceeds to operation 504, where the edge device 130 can employ a packet authenticator 132 to extract the token packet 118 from the secure transport layer network packet 136. The extraction of the token packet 118 can be performed based upon the manner in which the token packet 118 is inserted into the secure transport layer network packet 136. For example, if the token packet 118 is added at the beginning of the secure transport layer network packet 136, the packet authenticator 132 can retrieve the first few bytes of the secure transport layer network packet 136 to obtain the token packet 118. Similarly, if the token packet 118 is appended to the end of the secure network packet 136, the packet authenticator 132 can retrieve the last few bytes to extract the token packet 118.

From operation 504, the routine 500 proceeds to operation 506, where the packet authenticator 132 can obtain a verification key in order to authenticate the received secure network packet 136. As discussed above, the packet authenticator 132 can utilize the key ID 402 in the token packet 118 to retrieve a verification key corresponding to the token key 404 used when generating the signature 424. Depending on the authentication algorithm, the verification key and the token key can be a public key and a private key of a key pair, respectively, or the verification key can be the same as the token key 404 used to generate the signature 424.

The verification key can be obtained by the packet authenticator 132 by sending a request to the token service 126 using the key ID 402. Alternatively, to achieve faster verification key retrieval, the edge devices 130 can pre-store various verification keys in a local cache or in a cache shared by multiple edge devices 130. The verification keys can be periodically pulled from the token service 126 by the edge device 130 or pushed by the token service 126. If the secure tokens 116 issued by the token service 126 are temporary tokens, the verification keys obtained from the token service 126 can each have an expiration time associated therewith to indicate when the corresponding secure token 116 expires.

From operation 506, the routine 500 proceeds to operation 508 where a determination is made as to whether the secure token 116 corresponding to the extracted token packet 118 has expired. If so, the routine 500 proceeds to operation 520; otherwise, the routine 500 proceeds to operation 510, where the signature 424 can be verified. The verification of the signature 424 can be performed using the verification key obtained from operation 506 and following an algorithm consistent with the algorithm utilized to generate the signature 424.

The routine 500 then proceeds to operation 512 to determine whether the signature is valid. If so, the routine 500 proceeds to operation 514, where other verification can be performed. For example, if the token packet 118 includes a policy ID 420, the packet authenticator 132 can retrieve the corresponding policy and then verify in operation 516 whether the secure network packet 136 satisfies the requirements set forth in the policy. If it is determined that the policy is satisfied, the routine 500 proceeds to operation 518, where the packet authenticator 132 can remove the token packet 118 from the secure network packet 136 and forward the network packet 120 to the application server 122.

If the policy is not satisfied, or if it is determined in operation 512 that the signature 424 is not valid, the routine 500 then proceeds to operation 520, where the edge device 130 can block the secure network packet 136 to prevent it from reaching the application server 122. The routine 500 then proceeds to operation 522, where the edge device 130 can report the problem to the token verification service 128 by forwarding the unauthorized secure network packet 136 to the token verification service 128 for further analysis. From operation 522, the routine 500 proceeds to operation 524, where it ends.

Figure 6:
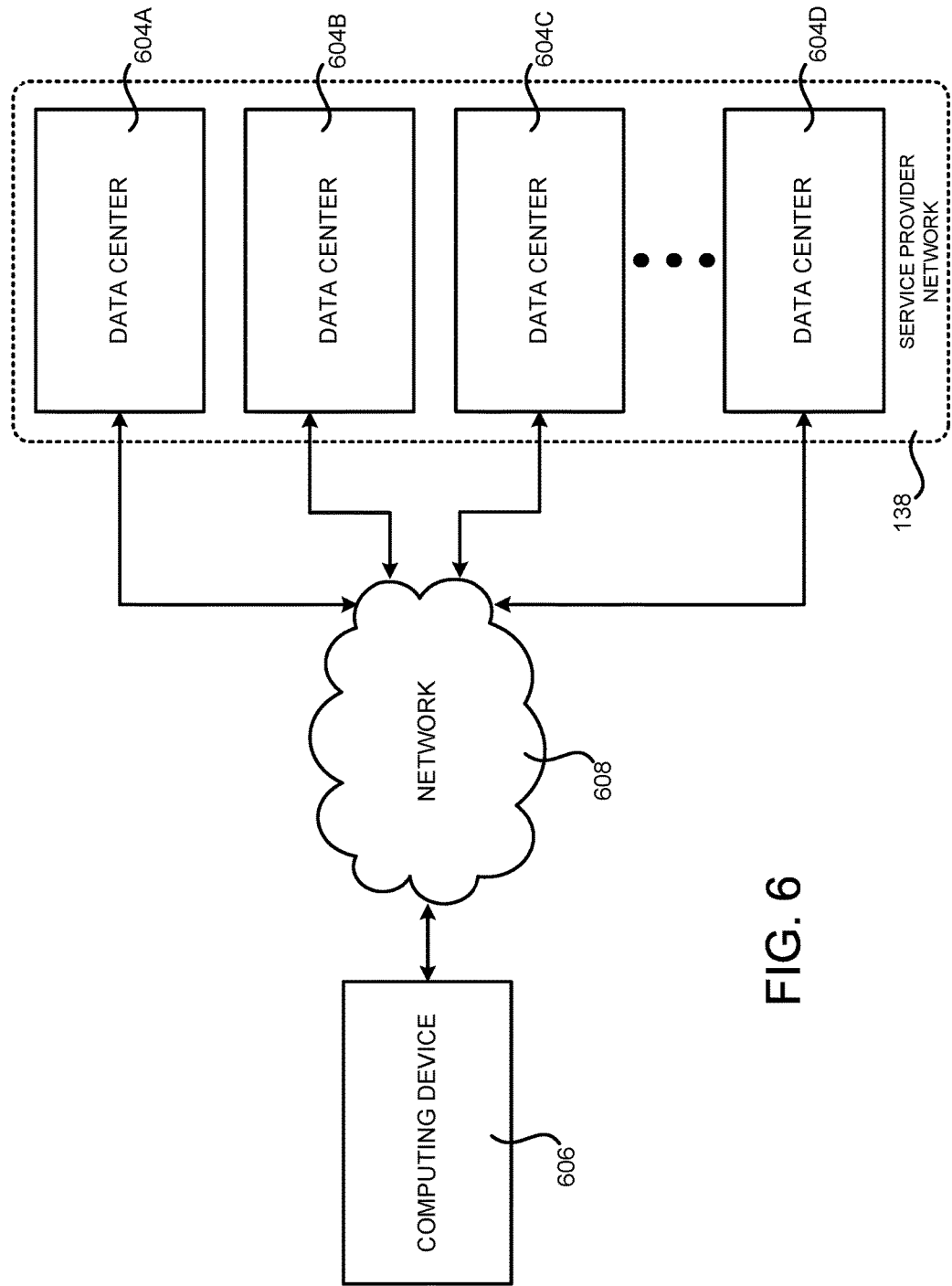
FIG. 6 is a system and network diagram that shows an illustrative operating environment that includes a service provider network that can be configured to implement aspects of the functionality described herein.

FIG. 6 and the following description are intended to provide a brief, general description of a suitable computing environment in which the configurations described herein can be implemented. In particular, FIG. 6 is a system and network diagram that shows aspects of a service provider network 138 that can be configured to provide transport layer authentication and authorization as disclosed herein.

As discussed above, the service provider network 138 can execute network services that provide computing resources on a permanent or an as-needed basis. Among other types of functionality, the computing resources provided by the service provider network 138 can be utilized to implement the various services described above, such as the token service 126, the identity and access management service 124, the token verification service 128, the edge device 130 and/or the packet authenticator 132. The edge devices 130 are located at the ingress point for traffic entering the service provider network 138. As also discussed above, the computing resources provided by the service provider network 138 can include various types of computing resources, such as data processing resources like virtual machine ("VM") instances, data storage resources, networking resources, data communication resources, network services, and the like.

Each type of computing resource provided by the service provider network 138 can be general-purpose or might be available in a number of specific configurations. For example, data processing resources can be available as physical computers or VM instances in a number of different configurations. The VM instances can be configured to execute applications, including web servers, application servers, media servers, database servers, and/or other types of programs. Data storage resources can include file storage devices, block storage devices, and the like. The service provider network 138 can also be configured to provide other types of computing resources not mentioned specifically herein.

The computing resources provided by the service provider network 138 are enabled in one implementation by one or more data centers 604A-604D (which might be referred to herein singularly as "a data center 604" or in the plural as "the data centers 604"). The data centers 604 are facilities utilized to house and operate computer systems and associated components. The data centers 604 typically include redundant and backup power, communications, cooling, and security systems. The data centers 604 can also be located in geographically disparate locations. One illustrative configuration for a data center 604 that can be utilized to implement the technologies disclosed herein will be described below with regard to FIG. 7.

The customers and other users of the service provider network 138, such as a third-party application developer or an end user of an application, can access the computing resources provided by the service provider network 138 over a network 608, which can be a WAN, such as the Internet, an intranet or an Internet service provider ("ISP") network or a combination of such networks. For example, and without limitation, a computing device 606 operated by a customer or other user of the service provider network 102, such as a third-party application developer, can be utilized to access the service provider network 138 by way of the network 608. It should be appreciated that a LAN, the Internet, or any other networking topology known in the art that connects the data centers 604 to remote customers and other users can be utilized. It should also be appreciated that combinations of such networks can also be utilized.

Figure 7:
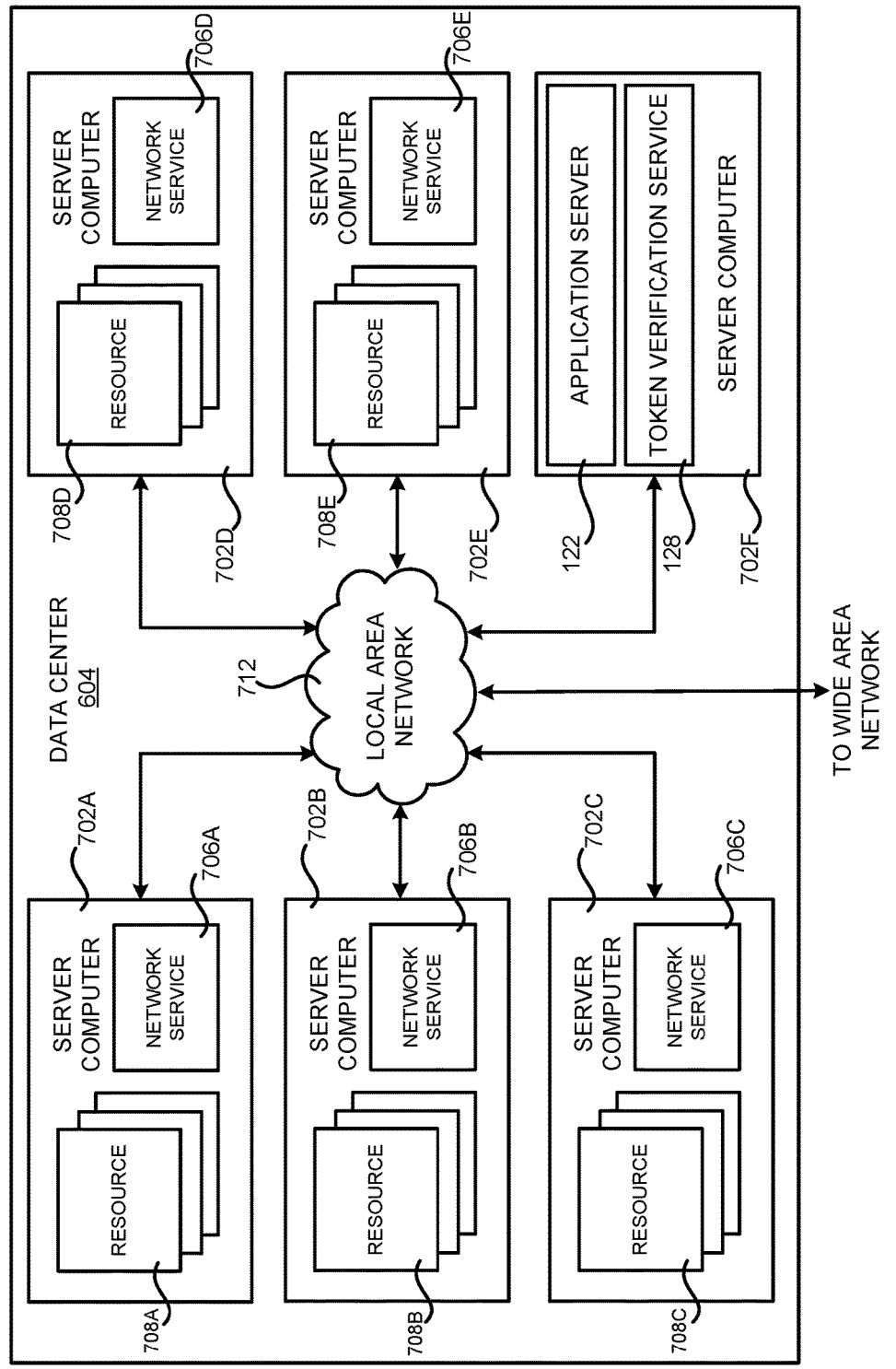
FIG. 7 is a computing system diagram illustrating a configuration for a data center that can be utilized to implement aspects of the technologies disclosed herein.

FIG. 7 is a computing system diagram that illustrates one configuration for a data center 604 that implements aspects of the technologies disclosed herein for transport layer authentication and authorization. The example data center 604 shown in FIG. 7 includes several server computers 702A-702F (which might be referred to herein singularly as "a server computer 702" or in the plural as "the server computers 702") for providing computing resources 708A-708E.

The server computers 702 can be standard tower, rack-mount, or blade server computers configured appropriately for providing the computing resources 708A-708E. As mentioned above, the computing resources provided by the service provider network 138 can be data processing resources such as VM instances or hardware computing systems, data storage resources, database resources, networking resources, and others. Some of the servers 702 can also be configured to execute network services 706A-706E, respectively, capable of instantiating, providing and/or managing the computing resources 708.

The data center 604 shown in FIG. 7 also includes a server computer 702F that can execute some or all of the software components described above. For example, and without limitation, the server computer 702F can be configured to execute an application server, which can offer the functionality provided by the application server 122 as described above to a client software application 104. In this way, the application server 122 can utilize the computing resources provided by the service provider network 138 to process user requests, obtain application credentials 112 and/or perform other functionalities to facilitate the execution of the software application 104. The server computer 702F can also be configured to execute other components and/or to store data for providing some or all of the functionality described herein. such as the token verification service 128. In this regard, it should be appreciated that the application server 122 and/or the token verification service 128 can execute on many other physical or virtual servers in the data centers 604 in various configurations.

In the example data center 604 shown in FIG. 7, an appropriate LAN 712 is also utilized to interconnect the server computers 702A-702F. The LAN 712 is also connected to the network 608 illustrated in FIG. 6. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 604A-604N, between each of the server computers 702A-702F in each data center 604, and, potentially, between computing resources 708 in each of the data centers 604. It should be appreciated that the configuration of the data center 604 described with reference to FIG. 7 is merely illustrative and that other implementations can be utilized.

Figure 8:
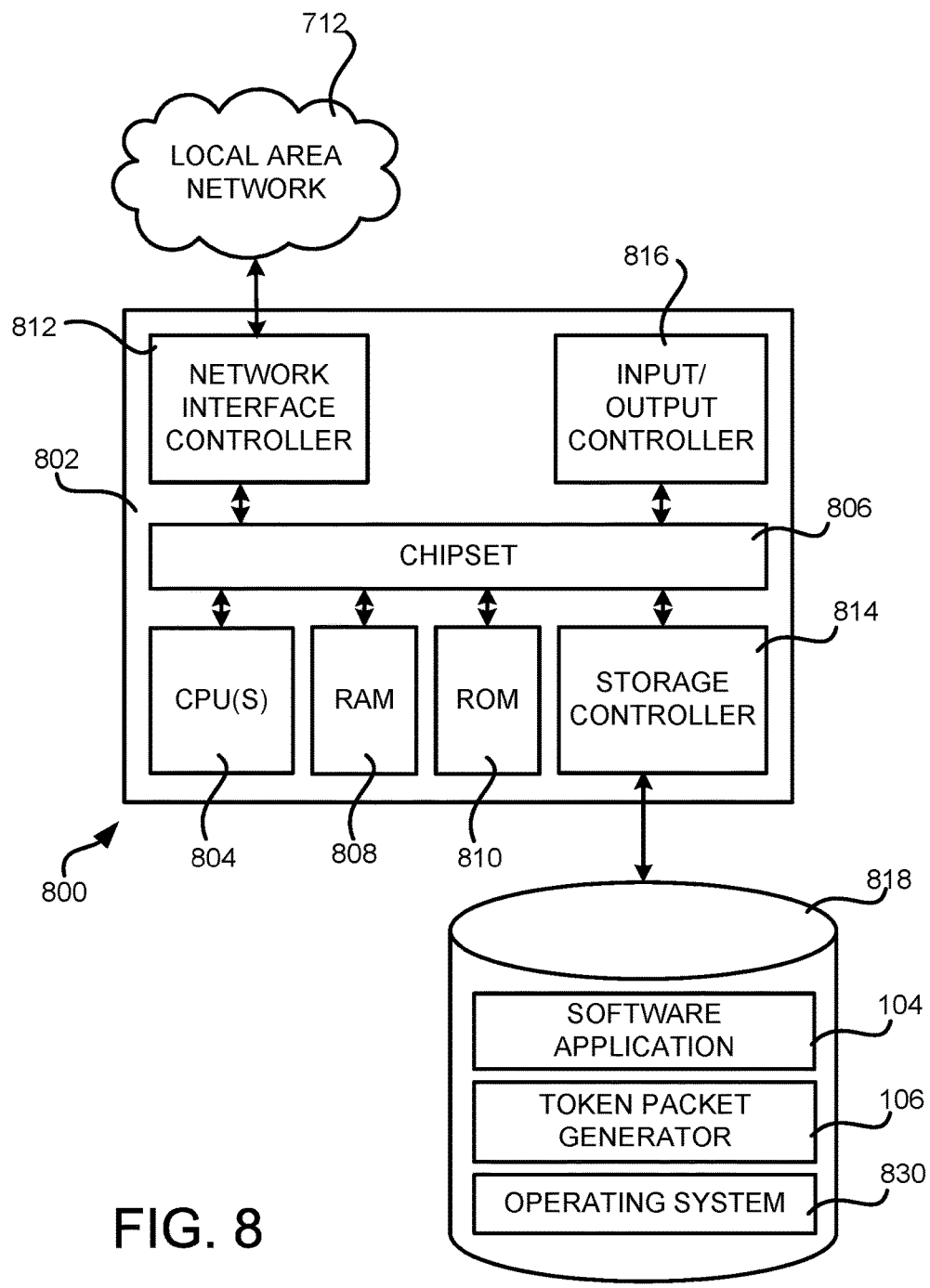
FIG. 8 is a computer architecture diagram showing an illustrative computer hardware architecture for implementing a computing device that can be utilized to implement aspects of the various technologies presented herein.

FIG. 8 shows an example computer architecture for a computer 800 capable of executing program components for implementing the functionality described above. The computer architecture shown in FIG. 8 illustrates a server computer, workstation, desktop computer, laptop, tablet, network appliance, e-reader, smartphone, an edge device, or other computing device, and can be utilized to execute any of the software components presented herein.

The computer 800 includes a baseboard 802, or "motherboard," which is a printed circuit board to which a multitude of components or devices can be connected by way of a system bus or other electrical communication paths. In one illustrative configuration, one or more central processing units ("CPUs") 804 operate in conjunction with a chipset 806. The CPUs 804 can be standard programmable processors that perform arithmetic and logical operations necessary for the operation of the computer 800.

The CPUs 804 perform operations by transitioning from one discrete, physical state to the next through the manipulation of switching elements that differentiate between and change these states. Switching elements can include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 can provide an interface to a RAM 808, used as the main memory in the computer 800. The chipset 806 can further provide an interface to a computer-readable storage medium such as a read-only memory ("ROM") 810 or non-volatile RAM ("NVRAM") for storing basic routines that help to startup the computer 800 and to transfer information between the various components and devices. The ROM 810 or NVRAM can also store other software components necessary for the operation of the computer 800 in accordance with the configurations described herein.

The computer 800 can operate in a networked environment using logical connections to remote computing devices and computer systems through a network, such as the network 712. The chipset 806 can include functionality for providing network connectivity through a NIC 812, such as a gigabit Ethernet adapter. The NIC 812 is capable of connecting the computer 800 to other computing devices over the network 712. It should be appreciated that multiple NICs 812 can be present in the computer 800, connecting the computer to other types of networks and remote computer systems.

The computer 800 can be connected to a mass storage device 818 that provides non-volatile storage for the computer. If the computer 800 is a client computing device 102, the mass storage device 818 can store an operating system 830, a software application 104, and token packet generator 106, which have been described in greater detail herein. If the computer 800 is utilized to implement the edge device 130, the mass storage device 818 can store the operating system of the edge device 130 and the packet authenticator 132. The mass storage device 818 can be connected to the computer 800 through a storage controller 814 connected to the chipset 806. The mass storage device 818 can consist of one or more physical storage units. The storage controller 814 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 800 can store data on the mass storage device 818 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 818 is characterized as primary or secondary storage, and the like.

For example, the computer 800 can store information to the mass storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 can further read information from the mass storage device 818 by detecting the physical states or characteristics of one or more particular locations within the physical storage units.

In addition to the mass storage device 818 described above, the computer 800 can access other computer-readable storage media to store and retrieve information, such as program modules, data structures, or other data. It should be appreciated by those skilled in the art that computer-readable storage media is any available media that provides for the non-transitory storage of data and that can be accessed by the computer 800.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 818 can store an operating system 830 utilized to control the operation of the computer 800. According to one configuration, the operating system comprises the LINUX operating system. According to another configuration, the operating system comprises the WINDOWS® SERVER operating system from MICROSOFT Corporation. According to further configurations, the operating system can comprise the UNIX operating system or one of its variants. It should be appreciated that other operating systems, such as the ANDROID operating system from GOOGLE INC., the iOS operating system from APPLE INC., the WINDOWS PHONE operating system from MICROSOFT Corporation, can also be utilized. The mass storage device 818 can store other system or application programs and data utilized by the computer 800.

In one configuration, the mass storage device 818 or other computer-readable storage media is encoded with computer-executable instructions which, when loaded into the computer 800, transform the computer from a general-purpose computing system into a special-purpose computer capable of implementing the configurations described herein. These computer-executable instructions transform the computer 800 by specifying how the CPUs 804 transition between states, as described above. According to one configuration, the computer 800 has access to computer-readable storage media storing computer-executable instructions which, when executed by the computer 800, perform the various processes described above with regard to FIGS. 1-7. The computer 800 can also include computer-readable storage media for performing any of the other computer-implemented operations described herein.

The computer 800 can also include one or more input/output controllers 816 for receiving and processing input from a number of input devices, such as a keyboard, a mouse, a touchpad, a touch screen, an electronic stylus, or other type of input device. Similarly, an input/output controller 816 can provide output to a display, such as a computer monitor, a flat-panel display, a digital projector, a printer, a plotter, or other type of output device. It will be appreciated that the computer 800 might not include all of the components shown in FIG. 8, can include other components that are not explicitly shown in FIG. 8, or might utilize an architecture completely different than that shown in FIG. 8.

Based on the foregoing, it should be appreciated that technologies for providing transport layer authentication of network traffic directed to an application server have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. A method for authenticating secure transport layer network packets, the method comprising:
  receiving, at a computing device, a secure transport layer network packet sent from a source computing device and addressed to a destination computing device, the secure transport layer network packet comprising a transport layer network packet and a token packet associated with the transport layer network packet, wherein the secure transport layer network packet comprises one of a User Datagram Protocol (UDP) packet or a Transmission Control Protocol (TCP) packet;

obtaining, by the computing device, a verification key for the secure transport layer network packet;
utilizing, by the computing device, the verification key to verify authenticity of the secure transport layer network packet based on data contained in the token packet;
determining, by the computing device, that the verification is successful; and
in response to determining that the verification is successful, forwarding, by the computing device, the transport layer network packet to the destination computing device.

2. The method of claim 1, further comprising in response to determining that the verification fails, blocking the secure transport layer network packet.

3. The method of claim 1, wherein the token packet comprises a signature generated based on data contained in the transport layer network packet using a token key, and wherein verifying authenticity of the secure transport layer network packet comprises verifying the signature using the verification key.

4. The method of claim 3, wherein the verification key is a public key and the token key is a private key.

5. The method of claim 3, wherein the verification key is retrieved from a cache accessible to the computing device.

6. The method of claim 5, wherein the verification key is retrieved by utilizing a key identifier (ID) that is associated with the token key and is contained in the token packet.

7. A system for authenticating secure transport layer network packets, the system comprising:
one or more computing devices communicatively connected to a source computing device and a destination computing device, the one or more computing devices being configured to:
receive, from the source computing device, a secure transport layer network packet addressed to the destination computing device, the secure transport layer network packet comprising a transport layer network packet and a token packet, wherein the secure transport layer network packet comprises one of a User Datagram Protocol (UDP) packet or a Transmission Control Protocol (TCP) packet;
verify authenticity of the secure transport layer network packet based on data contained in the token packet;
determine that the verification is successful; and
in response to determining that the verification is successful, forward the transport layer network packet to the destination computing device.

8. The system of claim 7, further comprising at least one computing device executing a token verification service, wherein the one or more computing devices are further configured to, in response to determining that the verification fails, block the transport layer network packet and forward the secure transport layer network packet to the token verification service.

9. The system of claim 7, wherein the token packet is generated using a token key having an expiration time, and wherein verifying authenticity of the secure transport layer network packet comprises determining that the expiration time has not been reached.

10. The system of claim 9, wherein verifying authenticity of the secure transport layer network packet further comprises in response to determining that the token expiration time has been reached, blocking the secure transport layer network packet from reaching the destination computing device.

11. The system of claim 7, wherein the token packet comprises a signature generated using a token key and a key identifier (ID) associated with the token key.

12. The system of claim 11, wherein the signature is generated based on a payload of the transport layer network packet.

13. The system of claim 11, wherein verifying authenticity of the secure transport layer network packet comprises:
obtaining a verification key utilizing the key ID contained in the token packet; and
verifying the signature based on the data contained in the transport layer network packet and the verification key.

14. The system of claim 13, further comprising at least one computing device executing a token service, wherein the verification key and the token key are generated by the token service.

15. The system of claim 13, wherein the one or more computing devices comprise a cache for storing secure keys, and wherein the verification key is retrieved from the cache using the key ID.

16. The non-transitory computer-readable storage medium of claim 9, wherein the non-transitory computer-readable storage medium has further instructions stored thereupon to verify authenticity of the secure transport layer network packet by, in response to determining that the token expiration time has been reached, blocking the secure transport layer network packet from reaching the destination computing device.

17. A non-transitory computer-readable storage medium having computer-executable instructions stored thereupon which, when executed by a computer, cause the computer to:
receive a secure transport layer network packet sent from a source computing device and addressed to a destination computing device, the secure transport layer network packet comprising a transport layer network packet and a token packet associated with the transport layer network packet, wherein the secure transport layer network packet comprises one of a User Datagram Protocol (UDP) packet or a Transmission Control Protocol (TCP) packet;
obtain a verification key for the secure transport layer network packet;
utilize the verification key to verify authenticity of the secure transport layer network packet based on data contained in the token packet;
determine that the verification is successful; and
in response to determining that the verification is successful, forward the transport layer network packet to the destination computing device.

18. The non-transitory computer-readable storage medium of claim 17, wherein the non-transitory computer-readable storage medium has further instructions stored thereupon to, in response to determining that the verification fails, block the secure transport layer network packet.

19. The non-transitory computer-readable storage medium of claim 17, wherein the token packet comprises a signature generated based on data contained in the transport layer network packet using a token key, and wherein the non-transitory computer-readable storage medium has further instructions stored thereupon to verify authenticity of the secure transport layer network packet by verifying the signature using the verification key.

20. The non-transitory computer-readable storage medium of claim 17, wherein the token packet is generated using a token key having an expiration time, and wherein the non-transitory computer-readable storage medium has further instructions stored thereupon to verify authenticity of the secure transport layer network packet by determining that the expiration time has not been reached.

* * * * *